(12) United States Patent
Hsu et al.

(10) Patent No.: US 9,202,133 B2
(45) Date of Patent: Dec. 1, 2015

(54) METHODS AND SYSTEMS FOR SCENE RECOGNITION

(71) Applicant: HTC CORPORATION, Taoyuan, Taoyuan County (TW)

(72) Inventors: Yu-Cheng Hsu, Taoyuan (TW); Chia-Yen Michael Lin, Taoyuan (TW); Jing-Lung Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 72 days.

(21) Appl. No.: 14/030,574

(22) Filed: Sep. 18, 2013

(65) Prior Publication Data

US 2015/0078614 A1    Mar. 19, 2015

(51) Int. Cl.
*G06K 9/40* (2006.01)
*G06K 9/46* (2006.01)
*G06K 9/00* (2006.01)

(52) U.S. Cl.
CPC .......... *G06K 9/4652* (2013.01); *G06K 9/00664* (2013.01); *G06K 9/4642* (2013.01)

(58) Field of Classification Search
None
See application file for complete search history.

(56) References Cited

U.S. PATENT DOCUMENTS 5,715,377 A * 2/1998 Fukushima et al. ........... 358/1.9
2003/0231856 A1* 12/2003 Ikeda .............................. 386/46

* cited by examiner

*Primary Examiner* — Eueng-Nan Yeh
(74) *Attorney, Agent, or Firm* — CKC & Partners Co., Ltd.

(57) ABSTRACT

Methods and systems for scene recognition are provided. At least one dark region from an image is searched, and color for pixels of the at least one dark region is calculated. It is determined whether a proportion of low colorfulness pixels to the pixels of the at least one dark region is greater than a predefined threshold, wherein when the color information of the respective pixel is less than a specific level, the respective pixel is determined as low colorfulness. When the proportion of low colorfulness pixels to the pixels of the at least one dark region is greater than the predefined threshold, a scene corresponding to the image is not determined as a backlight scene.

11 Claims, 3 Drawing Sheets

METHODS AND SYSTEMS FOR SCENE RECOGNITION

BACKGROUND OF THE INVENTION

1. Field of the Invention

The disclosure relates generally to methods and systems for scene recognition, and, more particularly to methods and systems for scene recognition that can recognize a backlight scene.

2. Description of the Related Art

Recently, portable devices, such as handheld devices, have become more and more technically advanced and multifunctional. For example, a handheld device may have telecommunications capabilities, e-mail message capabilities, an advanced address book management system, a media playback system, and various other functions. Due to increased convenience and functions of the devices, these devices have become necessities of life.

A handheld device may provide image capturing (picture-taking) capabilities operating like a digital camera, and picture takers can use the image capturing (picture-taking) capabilities of the device to take images and/or videos. Due to the convenient function, taking pictures with handheld device has become a very common behavior.

Generally, in the picture-taking devices, the type of scenes can be preset in the devices, and users can manually select one the preset scene, and load the corresponding parameters, pertaining to that scene, to boost visual quality. Currently, a function called scene recognition is commonly provided in the picture-taking devices, and the picture-taking process can be performed based on the recognition scene.

A backlight situation is always become disturbances for uses when taking pictures. Conventionally, in backlight scene detection method, a histogram is generally used to recognize the backlight scene. However, conventional methods have high failure rate in detection if the scene includes black or white objects.

BRIEF SUMMARY OF THE INVENTION

Methods and systems for scene recognition are provided.

In an embodiment of a method for scene recognition, at least one dark region from an image is searched, and color information for pixels of the at least one dark region is calculated. It is determined Whether a proportion of low colorfulness pixels to the pixels of the at least one dark region is greater than a predefined threshold, wherein when the color information of the respective pixel is less than a specific level, the respective pixel is determined as low colorfulness. When the proportion of low colorfulness pixels to the pixels of the at least one dark region is less than the predefined threshold, a scene corresponding to the image is determined. as a backlight scene.

An embodiment of a system for scene recognition comprises a storage unit and a processing unit. The storage unit comprises an image. The processing unit searches at least one dark region from the image, and calculates color information for pixels of the at least one dark region. The processing unit determines whether a proportion of low colorfulness pixels to the pixels of the at least one dark region is greater than a predefined threshold, wherein when the color information of the respective pixel is less than a specific level, the respective pixel is determined as low colorfulness. When the proportion of low colorfulness pixels to the pixels of the at least one dark region is greater than the predefined threshold, the processing unit determines a scene corresponding to the image is not a backlight scene.

In some embodiments, a histogram is generated for the image, wherein the histogram comprises a first peak corresponding to the at least one dark region, and a second peak corresponding to at least one bright region. It is determined whether the first peak corresponding to the at least one dark region is greater than a first threshold, and whether the second peak corresponding to the at least one bright region is greater than a second threshold. When the first peak is greater than the first threshold, and the second peak is greater than the second threshold, a scene corresponding to the image is determined as a backlight scene. In some embodiments, when the first peak is not greater than the first threshold, or the second peak is not greater than the second threshold, a scene corresponding to the image is determined as a backlight scene.

In some embodiments, when the proportion of low colorfulness pixels to the pixels of the at least one dark region is not greater than the predefined threshold, a scene corresponding to the image is determined as a backlight scene.

In some embodiments, the color information comprises Chrominance, Chroma, Hue, Saturation, and/or Intensity.

Methods for scene recognition may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for scene recognition are provided.

Figure 1:
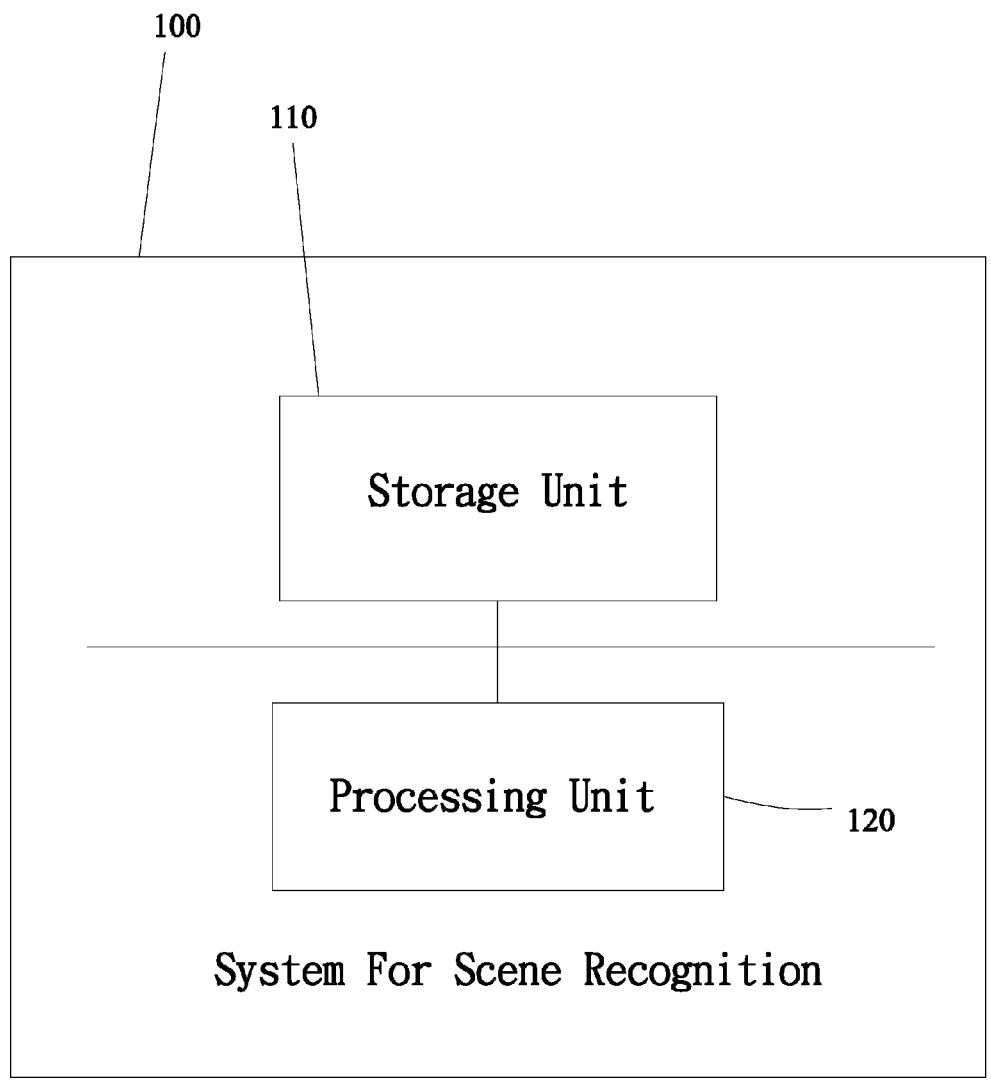
FIG. 1 is a schematic diagram illustrating an embodiment of a system for scene recognition of the invention.

FIG. 1 is a schematic diagram illustrating an embodiment of a system for scene recognition of the invention. The system for scene recognition 100 can be used in an electronic device, such as a computer, or a portable device, such as a digital camera, a handheld device such as a mobile phone, a smart phone, a PDA (Personal Digital Assistant), a GPS (Global Positioning System), or any picture-taking device.

The system for scene recognition 100 comprises a storage unit 110 and a processing unit 120. The storage unit 110 comprises at least one image. It is understood that, in some embodiments, the system for scene recognition 100 can also comprise an image capture unit (not shown in FIG. 1). The image capture unit may be a CCD (Charge Coupled Device) or a CMOS (Complementary Metal-Oxide Semiconductor), placed at the imaging position for objects inside the electronic device. The image capture unit can capture the image. It is also understood that, in some embodiments, the system for scene recognition 100 can also comprise a display unit (not shown in FIG. 1). The display unit can display related figures and interfaces, and related data, such as the image. It is understood that, in some embodiments, the display unit may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit. The processing unit 120 can control related components of the system for scene recognition 100, process the image, and perform the methods for scene recognition, which will be discussed further in the following paragraphs.

Figure 2:
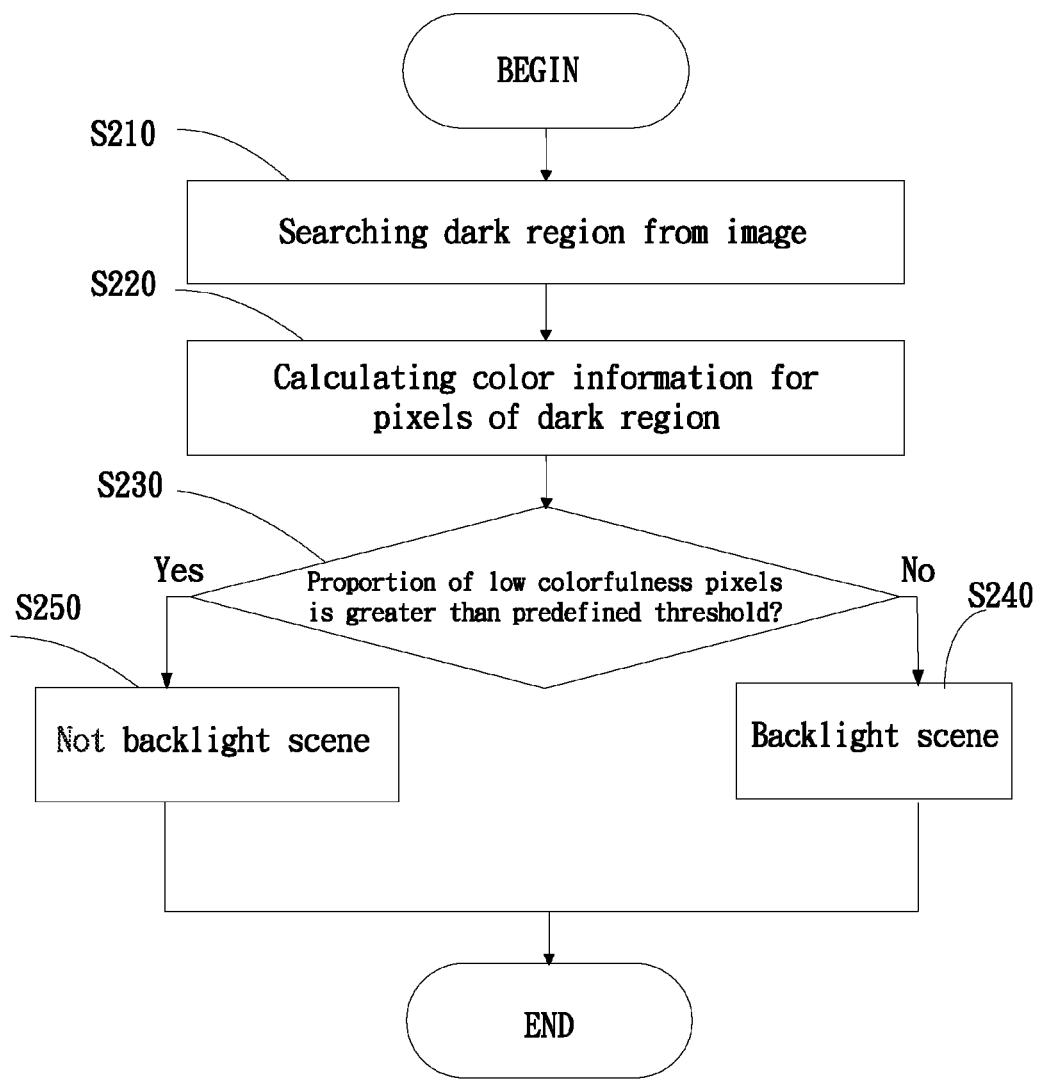
FIG. 2 is a flowchart of an embodiment of a method for scene recognition of the invention.

FIG. 2 is a flowchart of an embodiment of a method for scene recognition of the invention. The method for scene recognition can be used in an electronic device, such as a computer, or a portable device, such as a digital camera, a handheld device such as a mobile phone, a smart phone, a PDA, a GPS, or any picture-taking device.

In step S210, at least one dark region from an image is searched, and in step S220, color information for pixels of the at least one dark region is calculated. It is understood that, in some embodiments, the image may be stored in the electronic device in advance. In some embodiments, the image may be a preview image captured by an image capture unit of the electronic device. Additionally, in some embodiments, the color information of the respective pixel may comprise Chrominance, Chroma, Hue, Saturation, and/or Intensity. In step S230, it is determined whether a proportion of low colorfulness pixels to the pixels of the at least one dark region is greater than a predefined threshold. It is noted that, when the color information of the respective pixel is less than a specific level, the respective pixel is determined as low colorfulness. When the proportion of low colorfulness pixels to the pixels of the at least one dark region is not greater than the predefined threshold (No in step S230), in step S240, a scene corresponding to the image is determined as a backlight scene. When the proportion of low colorfulness pixels to the pixels of the at least one dark region is greater than the predefined threshold (Yes in step S230), in step S250, a scene corresponding to the image is determined as not a backlight scene.

It is understood that, in color theory, colorfulness is the degree of difference between a color and gray. A highly colorful stimulus is vivid and intense, while a less colorful stimulus appears more muted, closer to gray. Analyzing colorfulness of pixels can know how much color information in pixels. If the colorfulness of an object is high, it represents that the color of the object pixels looks saturated. Otherwise, the object pixels are closed to gray. Based on this theory, some not really backlight scene made up of some pure black and white object will not be detected as backlight scene.

Figure 3:
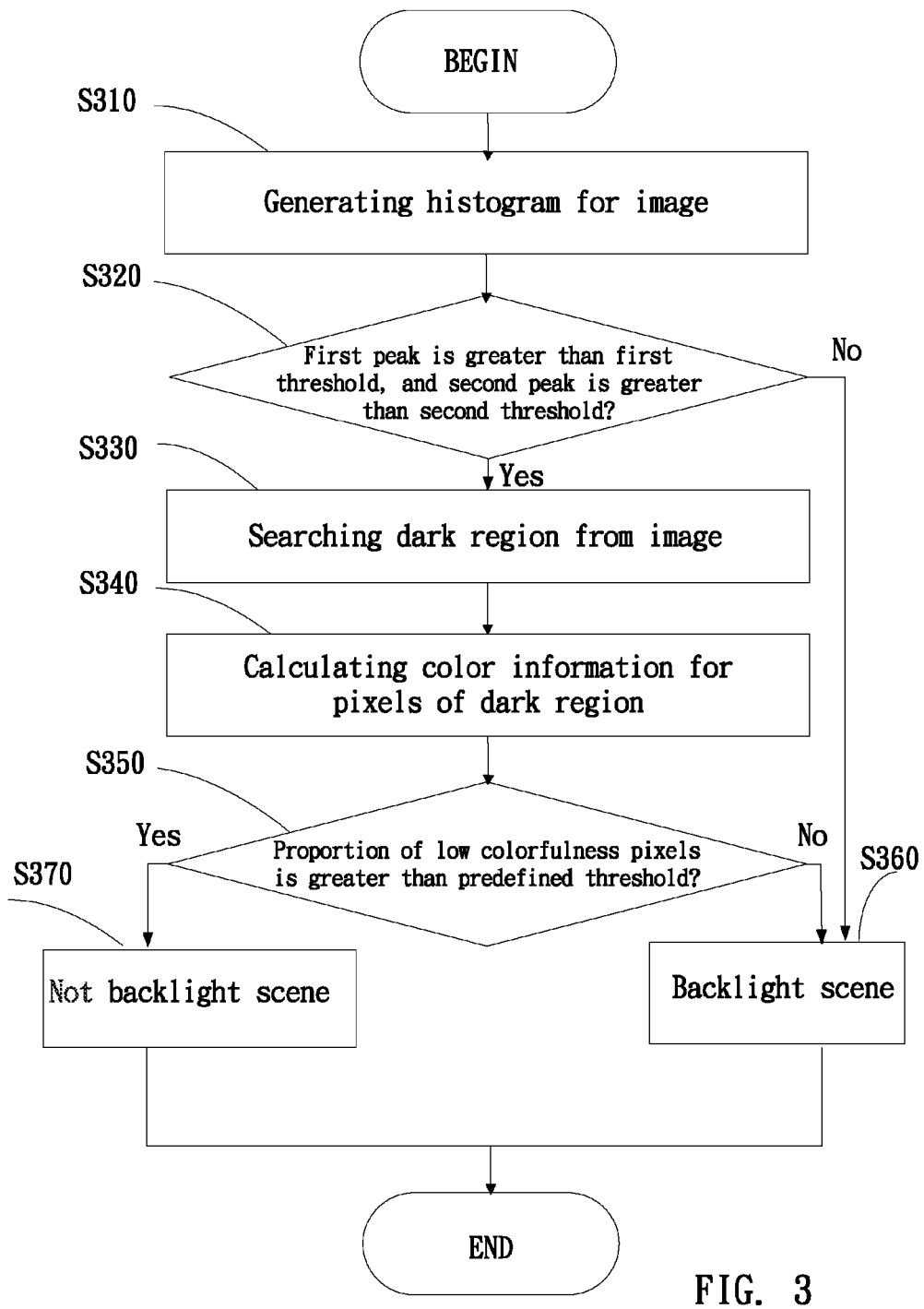
FIG. 3 is a flowchart of another embodiment of a method for scene recognition of the invention.

FIG. 3 is a flowchart of another embodiment of a method for scene recognition of the invention. The method for scene recognition can be used in an electronic device, such as a computer, or a portable device, such as a digital camera, a handheld device such as a mobile phone, a smart phone, a PDA, a GPS, or any picture-taking device.

In step S310, a histogram is generated for an image. Similarly, in some embodiments, the image may be stored in the electronic device in advance. In sonic embodiments, the image may be a preview image captured by an image capture unit of the electronic device. The histogram comprises at least a first peak corresponding to at least one dark region in the image, and a second peak corresponding to at least one bright region in the image. In step S320, it is determined whether the first peak corresponding to the at least one dark region is greater than a first threshold, and whether the second peak corresponding to the at least one bright region is greater than a second threshold. When the first peak is not greater than the first threshold, or the second peak is not greater than the second threshold (No in step S320), in step S360, a scene corresponding to the image is determined as a backlight scene. When the first peak is greater than the first threshold, and the second peak is greater than the second threshold (Yes in step S320), in step S330, at least one dark region from an image is searched, and in step S340, color information for pixels of the at least one dark region is calculated. It is understood that, in some embodiments, the color information of the respective pixel may comprise Chrominance, Chroma, Hue, Saturation, and/or Intensity. In step S350, it is determined whether a proportion of low colorfulness pixels to the pixels of the at it least one dark region is greater than a predefined threshold. Similarly, when the color information of the respective pixel is less than a specific level, the respective pixel is determined as low colorfulness. When the proportion of low colorfulness pixels to the pixels of the at least one dark region is not greater than the predefined threshold (No in step S350), in step S360, a scene corresponding to the image is determined as a backlight scene. When the proportion of low colorfulness pixels to the pixels of the at least one dark region is greater than the predefined threshold (Yes in step S350), in step S370, a scene corresponding to the image is not determined as a backlight scene.

Therefore, the methods and systems for scene recognition of the present invention can recognize a backlight scene according to color information, and further in histogram of image, thus reducing failure detection rate in backlight.

Methods for scene recognition may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for scene recognition for use in an electronic device, comprising:
    searching at least one dark region from an image;
    calculating color information for pixels of the at least one dark region;
    determining whether a proportion of low colorfulness pixels to the pixels of the at least one dark region is greater than a predefined threshold, wherein when the color information of the respective pixel is less than a specific level, the respective pixel is determined as low colorfulness; and
    when the proportion of low colorfulness pixels to the pixels of the at least one dark region is greater than the predefined threshold, determining a first scene corresponding to the image is not a backlight scene.

2. The method of claim 1, further comprising:
generating a histogram for the image, wherein the histogram comprises a first peak corresponding to the at least one dark region, and a second peak corresponding to at least one bright region;
determining whether the first peak corresponding to the at least one dark region is greater than a first threshold;
determining whether the second peak corresponding to the at least one bright region is greater than a second threshold; and
when the first peak is greater than the first threshold, and the second peak is greater than the second threshold, searching the at least one dark region from the image.

3. The method of claim 2, further comprising when the first peak is not greater than the first threshold, or the second peak is not greater than the second threshold, determining a second scene corresponding to the image is the backlight scene.

4. The method of claim further comprising when the proportion of low colorfulness pixels to the pixels of the at least one dark region is not greater than the predefined threshold, determining a second scene corresponding to the image is the backlight scene.

5. The method of claim 1, wherein the color information comprises Chrominance, Chroma, Hue, Saturation, or Intensity.

6. A system for scene recognition for use in an electronic device, comprising:
a storage device configured for storing an image; and
a processor coupled to the storage device, and configured for searching at least one dark region from the image, calculating color information for pixels of the at least one dark region, determining whether a proportion of low colorfulness pixels to the pixels of the at least one dark region is greater than a predefined threshold, wherein when the color information of the respective pixel is less than a specific level, the respective pixel is determined as low colorfulness, and when the proportion of low colorfulness pixels to the pixels of the at least one dark region is greater than the predefined threshold, determining a first scene corresponding to the image is not a backlight scene.

7. The system of claim 6, wherein the processor further generates a histogram for the image, wherein the histogram comprises a first peak corresponding to the at least one dark region, and a second peak corresponding to at least one bright region, determines whether the first peak corresponding to the at least one dark region is greater than a first threshold, determines whether the second peak corresponding to the at least one bright region is greater than a second threshold, and when the first peak is greater than the first threshold, and the second peak is greater than the second threshold, searching the at least one dark region from the image.

8. The system of claim 7, wherein when the first peak is not greater than the first threshold, or the second peak is not greater than the second threshold, the processor further determines a second scene corresponding to the image is the backlight scene.

9. The system of claim 6, wherein when the proportion of low colorfulness pixels to the pixels of the at least one dark region is not greater than the predefined threshold, the processor further determines a second scene corresponding to the image is the backlight scene.

10. The system of claim 6, wherein the color information comprises Chrominance, Chroma, Hue, Saturation, or Intensity.

11. A non-transitory machine-readable storage medium comprising a computer program, which, when executed, causes a device to perform a method for scene recognition, wherein the method comprises:
searching at least one dark region from an image;
calculating color information for pixels of the at least one dark region;
determining whether a proportion of low colorfulness pixels to the pixels of the at least one dark region is greater than a predefined threshold, wherein when the color information of the respective pixel is less than a specific level, the respective pixel is determined as low colorfulness; and
when the proportion of low colorfulness pixels to the pixels of the at least one dark region is greater than the predefined threshold, determining a first scene corresponding to the image is not a backlight scene.

* * * * *